(12) United States Patent
Noh et al.

(10) Patent No.: US 7,704,393 B2
(45) Date of Patent: Apr. 27, 2010

(54) HOLLOW FIBER MEMBRANE MODULE AND METHOD FOR MAKING THEREOF

(75) Inventors: Soo-Hong Noh, Wonju (KR); Oh-Sung Kwon, Seoul (KR); Jin-Ho Chang, Seoul (KR); Sang-Hoon Kim, Suwon (KR)

(73) Assignee: Industry-Academic Cooperation Foundation, Seoul (KR)

( * ) Notice: Subject to any disclaimer, the term of this patent is extended or adjusted under 35 U.S.C. 154(b) by 545 days.

(21) Appl. No.: 10/556,314

(22) PCT Filed: May 13, 2004

(86) PCT No.: PCT/KR2004/001127

§ 371 (c)(1),
(2), (4) Date: Oct. 19, 2006

(87) PCT Pub. No.: WO2004/101120

PCT Pub. Date: Nov. 25, 2004

(65) Prior Publication Data
US 2007/0056893 A1    Mar. 15, 2007

(30) Foreign Application Priority Data
May 13, 2003  (KR) .................... 10-2003-0030323

(51) Int. Cl.
*B01D 63/02* (2006.01)
*B01D 61/00* (2006.01)

(52) U.S. Cl. ..................... 210/321.69; 210/321.88; 210/321.89; 210/321.9

(58) Field of Classification Search .............. None
See application file for complete search history.

(56) References Cited
U.S. PATENT DOCUMENTS
4,876,006 A * 10/1989 Ohkubo et al. ......... 210/321.69

(Continued)

FOREIGN PATENT DOCUMENTS
JP  50-73882 A  6/1975

(Continued)

OTHER PUBLICATIONS

Yamamoto et al., Direct Solid-Liquid Separation using Hollow Fiber Membrane In An Activated Sludge Aeration Tank, Wat. Sci. Tech., vol. 21, 1989, Brighton, Great Britain, pp. 43-54.

(Continued)

*Primary Examiner*—Krishnan S Menon
(74) *Attorney, Agent, or Firm*—Alston & Bird LLP (57) ABSTRACT

It is an object of the present invention to provide a hollow fiber membrane module which maximizes the efficiency of removing scale-like contaminants generated at the water treatment using hollow fiber membranes, and a method of manufacturing the same. The hollow fiber membrane module includes hollow fiber membranes for making water treatment due to the pressure difference, and a collector fixing the hollow fiber membranes in bundle. A treated-water tube is extended to the inside of the collector, and communicated with the inner passage of the hollow fiber membranes to deliver the water treated through the hollow fiber membranes. A diffuser is installed at the collector to diffuse bubbles to the hollow fiber membranes. An air tube is extended to the collector, and connected to the diffuser to feed air. Dividers are installed over the collector to partition the hollow fiber membranes into a plurality of bundles.

11 Claims, 7 Drawing Sheets

U.S. PATENT DOCUMENTS

| | | |
|---|---|---|
| 5,066,397 A | 11/1991 | Muto et al. |
| 5,607,593 A * | 3/1997 | Cote et al. ............... 210/650 |
| 5,922,201 A * | 7/1999 | Yamamori et al. ..... 210/321.79 |
| 6,294,039 B1 | 9/2001 | Mahendran et al. |
| 6,331,248 B1 | 12/2001 | Taniguchi et al. |
| 2001/0037967 A1 | 11/2001 | Rabie et al. |
| 2002/0179516 A1* | 12/2002 | Behrendt et al. ......... 210/321.8 |
| 2002/0189999 A1* | 12/2002 | Espenan et al. ............ 210/636 |
| 2003/0024881 A1* | 2/2003 | Kalthod .................... 210/649 |
| 2004/0035779 A1* | 2/2004 | Vossenkaul et al. ...... 210/321.6 |

FOREIGN PATENT DOCUMENTS

| | | |
|---|---|---|
| JP | 59004403 A * | 1/1984 |
| JP | 02-36579 U | 10/1990 |
| JP | 07-148421 A | 6/1995 |
| JP | 07-185268 A | 7/1995 |
| JP | 09-010561 A | 1/1997 |
| JP | 2000-084374 A | 3/2000 |
| KR | 1020020039383 A | 5/2002 |

OTHER PUBLICATIONS

Ahmed et al., Use Of Sealed End Hollow Fibers For Bubbleless Membrane Aeration: Experimental Studies, Journal Of Membrane Science, 69 (1992), Eldsevier Science Publishers B.V., Amsterdam, pp. 1-10.

* cited by examiner

|  | Comparative Example 1 | Comparative Example 2 | Comparative Example 3 | Example 1 |
|---|---|---|---|---|
| Membrane area (m²) | 100 | 84 | 46 | 22 |
| Amount of air supply/Membrane area | 0.6-0.8 | 0.6-0.8 | 0.7-0.9 | 0.2-0.3 |

HOLLOW FIBER MEMBRANE MODULE AND METHOD FOR MAKING THEREOF

BACKGROUND OF THE INVENTION (a) Field of the Invention

The present invention relates to membranes for making water treatment, and in particular, to a hollow fiber membrane module with enhanced cleaning efficiency and a method of manufacturing the same.

(b) Description of Related Art

Generally, the usage of membranes in treating purified water, sewage and waste water has been increasingly made since 1960s.

However, the conventional usage of membranes concerns higher degree treatment where the primarily treated water is re-treated using a separate membrane process to thereby obtain high quality treated water.

In order to obtain high quality treated water, an additional equipment should be provided to the existent facility, and hence, much cost should be consumed in installing, operating and maintaining it.

In this situation, a membrane bio reactor (MBR) has been significantly developed with the beginning of an experiment where hollow fiber membranes are directly dipped in a reactor to treat water, disclosed in an article with a title of "Direct Solid-Liquid Separation Using Hollow Fiber Membrane in an Activated Sludge Aeration Tank" by Kazuo Yamamoto et al. in 1989.

The MBR process involves a high concentration activated sludge of MLSS 8000-15000 ppm, compared to the conventional activated sludge process, and is operated to treat the sewage within a short period of time, thereby reducing the space required for the sewage treatment.

Furthermore, even with the presence of abnormalities such as shock loading, bulking and foaming which are mainly made with the activated sludge process using microorganisms with the poor precipitation of the activated sludge, treated water can be obtained in a stable manner.

However, the most serious problem with the MBR process is the phenomenon of membrane fouling. As the driving force of the membrane is largely due to the pressure difference, the activated sludge and other membrane contaminating materials within the reactor are accumulated at the membranes to thereby reduce the effective membrane surface area and decrease the amount of treated water.

In order to reduce the membrane fouling or contaminating phenomenon, the membrane materials have been studied by many researchers, and the techniques of physically inducing cross-flow on the surface of the membrane have been investigated.

The studies about the membrane materials have been made in the direction of reforming the surface of the membrane using surfactant or plasma. The physically-oriented process is conducted to exert a physical effect based on air, particularly, a cross flow on the membrane surface, and to sweep away the sludge cake accumulated on the membrane surface, or prevent the accumulation of the sludge cake.

In order to minimize the membrane contamination, various attempts have been made in the following ways.

In the case of the module of the Mitsubishi rayon company or the Zenon company, the treated water collectors are placed at both sides of the hollow fiber membranes, and the water treated through the membranes is collected at the both-sided collectors, followed by transferring it to a treatment water bath using a pump.

In case the treated water collectors are placed at both ends of the hollow fiber membranes, the both ends of the hollow fiber membranes are bound while limiting the movement of the hollow fiber membranes due to the air. Consequently, it is limited to obtain the desired membrane contamination reduction effect using the cross flow due to the air or the physical vibration due to the air.

Furthermore, as the two types of modules both involve two locations initially influenced by the pressure reduction (where the highest pressure difference is made), the accumulation of contaminants at those locations cannot be prevented.

With the module of the Zenon company, the air fed from the bottom goes up while elevating the activated sludge. The elevated activated sludge does not completely pass through the collector placed at the top of the module while being not fluently flown, and is stopped by the top collector so that it is again accumulated on the surface of the membranes due to the pressure difference at that location.

The membrane contamination (particularly due to the sludge cake) continuously propagates to the region where the pressure difference is relatively great, that is, the contamination degree is less, and as a result, the hollow fiber membranes are wholly contaminated. This phenomenon makes the cycle of the maintenance cleaning speedy, and as a result, the lifespan of the hollow fiber membranes is reduced.

Meanwhile, the article published by T. Ahmed et al. in 1992 with a title of "Use of Sealed-end Hollow Fibers for Bubbleless Membrane Aeration: experimental studies" discloses a module where the treated water collector is provided only at the one-sided front end of the hollow fiber membranes, although the usage thereof is different from that of the above module.

The Japanese Patent Application No. JP11128692 applied by the Toray company, the Japanese Patent Application No. JP10202270 applied by the Kuraray, the Korean Patent Publication No. 2001-112874 or the Korean Patent Publication No. 2002-39383 discloses a module similar to the above module.

However, the above structure also involves predictable problems. For instance, with the hollow fiber membrane module of the Toray company, only the bottom end of the hollow fiber membranes is fixed to the collector, and the hollow fiber membrane within the module is liable to be fallen. In operation, different air flows are abnormally made so that the hollow fiber membranes are tangled with each other. The physical stress is concentrated on the tangled portions of the hollow fiber membranes so that the hollow fiber membranes are cut at the tangled portions thereof, or at the interface thereof with the fixative.

The falling of the membranes within the module is not nearly made in the settling tank, but may be easily made when the hollow fiber membrane module is picked up from the aeration tank.

Furthermore, when the hollow fiber membranes within the module are tangled and broken, the balance of the diffuser is not maintained in a stable manner, and the water pressure applied to the diffuser is differentiated. The amount of air is small where the water pressure is high, and large where the water pressure is low so that the fluid flow from the latter to the former is made, and the hollow fiber membranes are directed along the flow, and tangled with each other.

Furthermore, when the hollow fiber membrane module is inclined in any one side, the locations of the module contacting the air flow are differentiated so that the fluid flow with a predetermined pattern is not induced. With the different fluid flows, a reverse flow is made within the module so that the hollow fiber membranes are tangled with each other. The tangled portions of the hollow fiber membranes continuously receive the physical stress of the fluid flows so that they are cut, or the whole stress is applied to the interface between the fixative and the hollow fiber membranes so that the hollow fiber membranes are cut at that interface.

The problematic falling of the hollow fiber membranes is easily made as the size of the hollow fiber membrane module becomes enlarged. As the conventional modules are not enlarged, many modules should be used to realize high capacity. Accordingly, the economical burden becomes increased to make, operate and maintain the relevant facilities.

Meanwhile, in order to manufacture a hollow fiber membrane module, the respective hollow fiber membranes should be made as a unit, and for this purpose, the hollow fiber membranes should be fixed to each other by interposing a thermoplastic or thermosetting material between the outer circumferences thereof.

It is most important to prevent the fixative from intruding the inner bore of the hollow fiber membrane and clogging it, and to prevent the generation of minute pores between the hollow fiber membrane and the fixative, through which the contaminants are input.

In this connection, the one-sided inner bore of the hollow fiber membrane is first fired or blocked by using another material, and after the hollow fiber membrane is completely fixed using a fixative, cut by a predetermined height, followed by recovering the inner bore thereof. In order to cut the bottom end portion of the hollow fiber membrane, a band saw, a sharp knife, a hydraulic cutter or a laser may be used.

With the conventional structure, the secondary wastes of the fixative and the hollow fiber membrane pieces after the cutting cannot be recycled, and induce economical loss. Furthermore, with the usage of a band saw, the pieces of the fixative broken due to the band saw clog the inner bore of the hollow fiber membrane, thereby inducing the pressure loss. In case a knife or a hydraulic cutter is used while requiring high pressure or power, the fixative is liable to be detached from the mold so that the contaminants are flown into the treated water.

The above problems are more frequently made as the module becomes enlarged. The laser technique is advantageous in enlarging the module, but the facility cost related thereto is high.

Meanwhile, the most important problem with the conventional techniques concerns the packing density of the hollow fiber membrane module.

The packing density of the module depends upon how many hollow fiber membranes can be packed within the module at a unit area. With the conventional submerged type hollow fiber membrane module, the packing density thereof is at best 10-25%, and hence, many modules should be used to treat the waste water, incurring economical loss.

The fixative for fixing the hollow fiber membranes to the mold has a relatively high viscosity, and as it is solidified, the viscosity thereof becomes increased while making it difficult for the fixative to intrude the gap between the hollow fiber membranes. Consequently, many hollow fiber membranes cannot be incorporated within a mold.

Furthermore, in case the module is formed without arbitrarily spacing the hollow fiber membranes from each other, even if the packing density becomes lowered, some of the hollow fiber membranes may be densely grouped while making it difficult for the fixative to intrude between the hollow fiber membranes.

In order to solve the problematic intrusion of the fixative, with the Zenon company, as disclosed in US006294039B1 or US006042677A, hollow fiber membranes are arranged and attached on a tape such that the distances between the hollow fiber membrane neighbors are constantly maintained, or the same effect is made using an adhesive.

However, with the conventional structure for making the fixative easily intrude the gap between the hollow fiber membranes, as the hollow fiber membranes are arbitrarily spaced apart from each other, it cannot be expected to achieve high packing density.

Furthermore, US Patent No. 20010037967A1 and US Patent No. 20020153299A1 disclose a method of using two different materials in forming a hollow fiber membrane module. In the former case where a liquid-phased filler is used as a temporary fixative, the liquid filler rides along the hollow fiber membranes due to the capillary phenomenon, and fills the space for a permanent fixative so that the permanent fixative cannot intrude between the hollow fiber membranes.

In the latter case where the temporary fixative is based on solid particulate powder, the powdered fixative should thoroughly intrude the inner bore of the hollow fiber membranes as well as the gap between the hollow fiber membranes.

However, with the conventional technique, it is difficult to fill the solid-phased temporary fixative between the hollow fiber membranes by a predetermined height. In case the temporary fixative has a relatively large size, the space therefor becomes widened so that the permanent fixative may intrude and clog the inner bore of the hollow fiber membranes. In case a water-insoluble temporary fixative is used, it is difficult to completely recover the temporary fixative. In such a case, the temporary fixative is flown to the treated water, thereby deteriorating the quality thereof.

BRIEF SUMMARY OF THE INVENTION

It is a first object of the present invention to provide a hollow fiber membrane module which maximizes the efficiency of removing scale-like contaminants generated at the water treatment using hollow fiber membranes, and a method of manufacturing the same.

It is a second object of the present invention to provide a hollow fiber membrane module which increases the number of hollow fiber membranes incorporated into a module, thereby heightening the packing density thereof, and a method of manufacturing the same.

It is a third object of the present invention to provide a hollow fiber membrane module which reinforces the rigidity of hollow fiber membranes, and prevents the hollow fiber membranes from being cut due to the movement of the whole hollow fiber membranes, and a method of manufacturing the same.

It is a fourth object of the present invention to provide a hollow fiber membrane module which prevents hollow fiber membranes with one-sided free ends from being tangled or fallen to thereby maximize the size of the module, and a method of manufacturing the same.

It is a fifth object of the present invention to provide a hollow fiber membrane module which concentrates the bubbles diffused from the diffuser on hollow fiber membranes to thereby heighten the utilization of the bubbles, and maximizes the rate of removing contaminants per the usage amount of air, and a method of manufacturing the same.

It is a sixth object of the present invention to provide a hollow fiber membrane module which improves the fixation structure of hollow fiber membranes to reduce the occurrence of secondary wastes, and prevents the clogging of the inner bores of the hollow fiber membranes or the flowing of the contaminants to the treated water, and a method of manufacturing the same.

In order to achieve the first object of the present invention, only the bottom ends of the hollow fiber membranes are fixed to a collector, and the top ends thereof are free.

That is, the hollow fiber membrane module includes hollow fiber membranes with top free ends and bottom ends fixed to a collector, a diffuser installed at the collector to diffuse bubbles, an air pipe extended to the collector to feed air to the diffuser, and a discharge pipe for discharging the water treated through the hollow fiber membranes.

In order to achieve the second and the third objects of the present invention, a coating film based on a water-insoluble material is coated on the outer circumference of the hollow fiber membranes.

The coating film is preferably formed with a material having excellent adhesion in relation to the hollow fiber membranes, such as ethylene vinyl acetate.

The coating film has a bottom end placed at the location of the hollow fiber membrane spaced apart from the bottommost end thereof by a predetermined height.

The coating film has a top end placed at the location of the hollow fiber membrane spaced apart from the top end of the permanent fixative by a predetermined height. This is because the pressure reduction of the hollow fiber membrane should be initiated at the location under the influence of bubbles.

With the coating of the coating film, the rate of intrusion of the permanent fixative between the hollow fiber membranes is enhanced, thereby maximizing the packing density of the hollow fiber membranes to the submerged type module by 80%.

In order to achieve the fourth object of the present invention, dividers are installed vertical to the collector to partition the hollow fiber membranes fixed to the collector into a plurality of regions.

In order to achieve the fifth object of the present invention, a cylindrical-shaped housing surrounds the hollow fiber membranes.

The housing is fixed to the outer ends of the dividers, and the bottom end portion is opened to form a waste water inlet hole for introducing the waste water to the hollow fiber membranes.

In order to achieve the sixth object of the present invention, fixatives for fixing the hollow fiber membranes to a mold of the collector have a temporary fixative formed with a ductile material capable of making solid to liquid phase transition, and a permanent fixative for substantially fixing the hollow fiber membranes.

In order to fix the hollow fiber membranes to the mold, the hollow fiber membranes are first fixed to the mold using a temporary fixative. Thereafter, a permanent fixative is formed on the temporary fixative, and the bottom end portion of the hollow fiber membranes with the temporary fixative is cut.

The permanent fixative is formed with an adhesive material being not chemically reactant with the temporary fixative, such as polyurethane and epoxy.

The temporary fixative is formed with an adhesive material capable of making solid to liquid phase transition, preferably, polyethylene glycol (PEG) or silicon.

The temporary fixative is in a liquid phase, and has a temperature controlled viscosity to prevent the liquid-phased temporary fixative from riding along the gap between the hollow fiber membranes due to the capillary phenomenon.

The waste water inlet hole of the housing is preferably placed at the top end of the coating film. More preferably, the top end of the waste water inlet hole is placed at the same plane as the top end of the coating film, or at the plane slightly higher than the latter.

The process of fixing hollow fiber membranes to a mold using a temporary fixative includes the steps of: melting the temporary fixative to the melting point thereof to be in a liquid phase; injecting the liquid-phased temporary fixative between the hollow fiber membranes and the mold and solidifying the temporary fixative to make unit bundles; putting the respective unit bundles within the whole mold and intruding a permanent fixative to the membranes over the temporary fixative; and recovering the temporary fixative by heating the bottom end portion of the mold formed with the temporary fixative.

With such a process, the temporary fixative can be easily recovered.

In the process of melting the temporary fixative, the viscosity of the temporary fixative is controlled by varying the temperature thereof to prevent the occurrence of the capillary phenomenon, thereby forming the temporary fixative between the hollow fiber membranes with a uniform height.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

The above and other advantages of the present invention will become more apparent by describing preferred embodiments thereof in detail with reference to the accompanying drawings in which.

*Description of the reference numerals for main components of the drawings*

| 10: | Hollow fiber membrane, | 20: | Collector |
| 30: | Treated-water tube, | 40: | Air tube |
| 50: | Diffuser, | 60: | Divider |
| 70: | Housing, | 71: | Inlet hole |
| 80: | Permanent fixative, | 81: | Temporary fixative |
| 90: | Coating film | | |

DETAILED DESCRIPTION OF PREFERRED EMBODIMENTS

The present invention will be described more fully hereinafter with reference to the accompanying drawings, in which preferred embodiments of the invention are shown.

Figure 1:
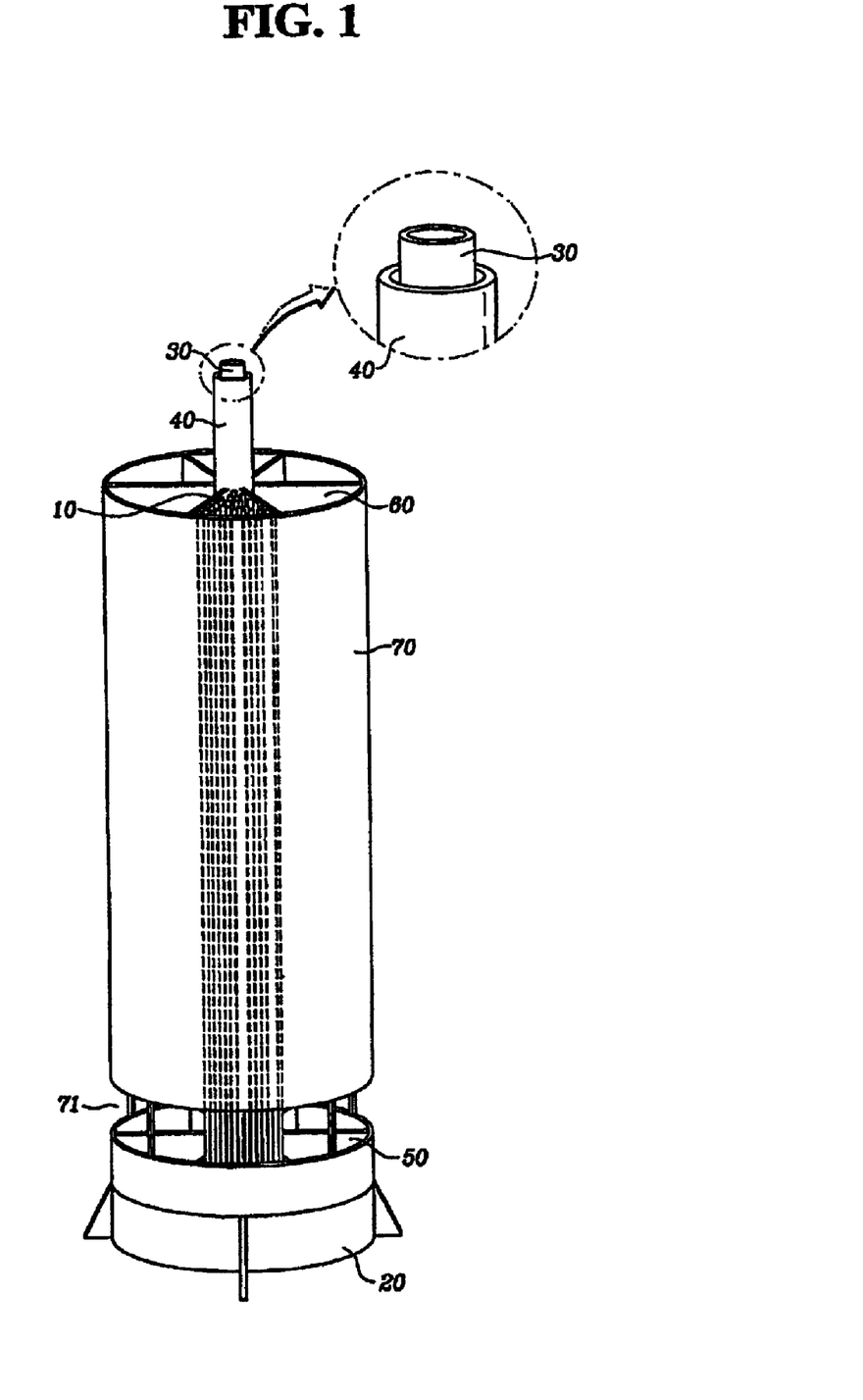
FIG. 1 is a schematic perspective view of a hollow fiber membrane module according to an embodiment of the present invention.
Figure 2:
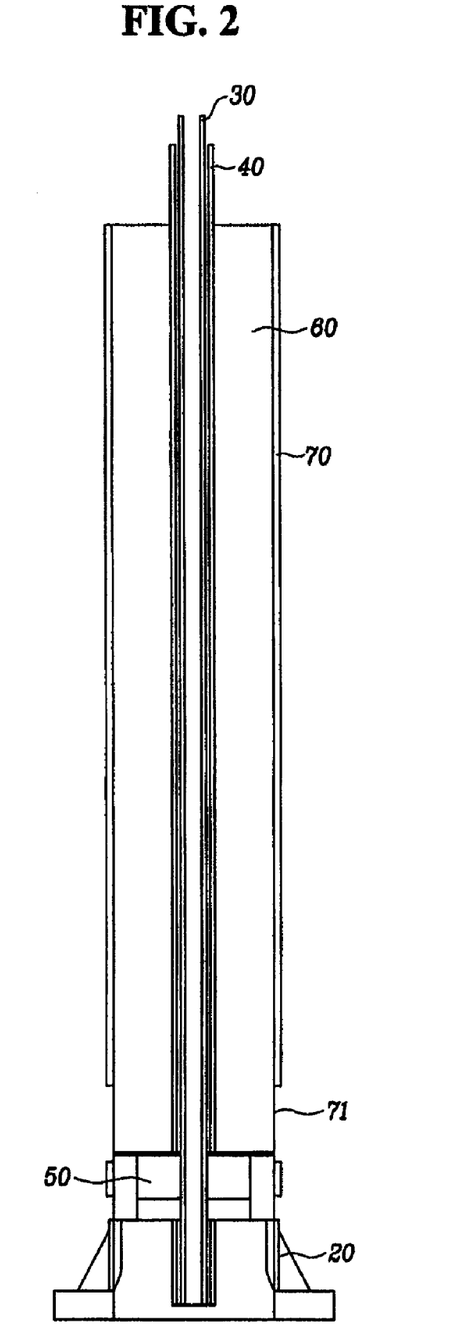
FIG. 2 is a plan view of the hollow fiber membrane module according to the embodiment of the present invention.
Figure 3:
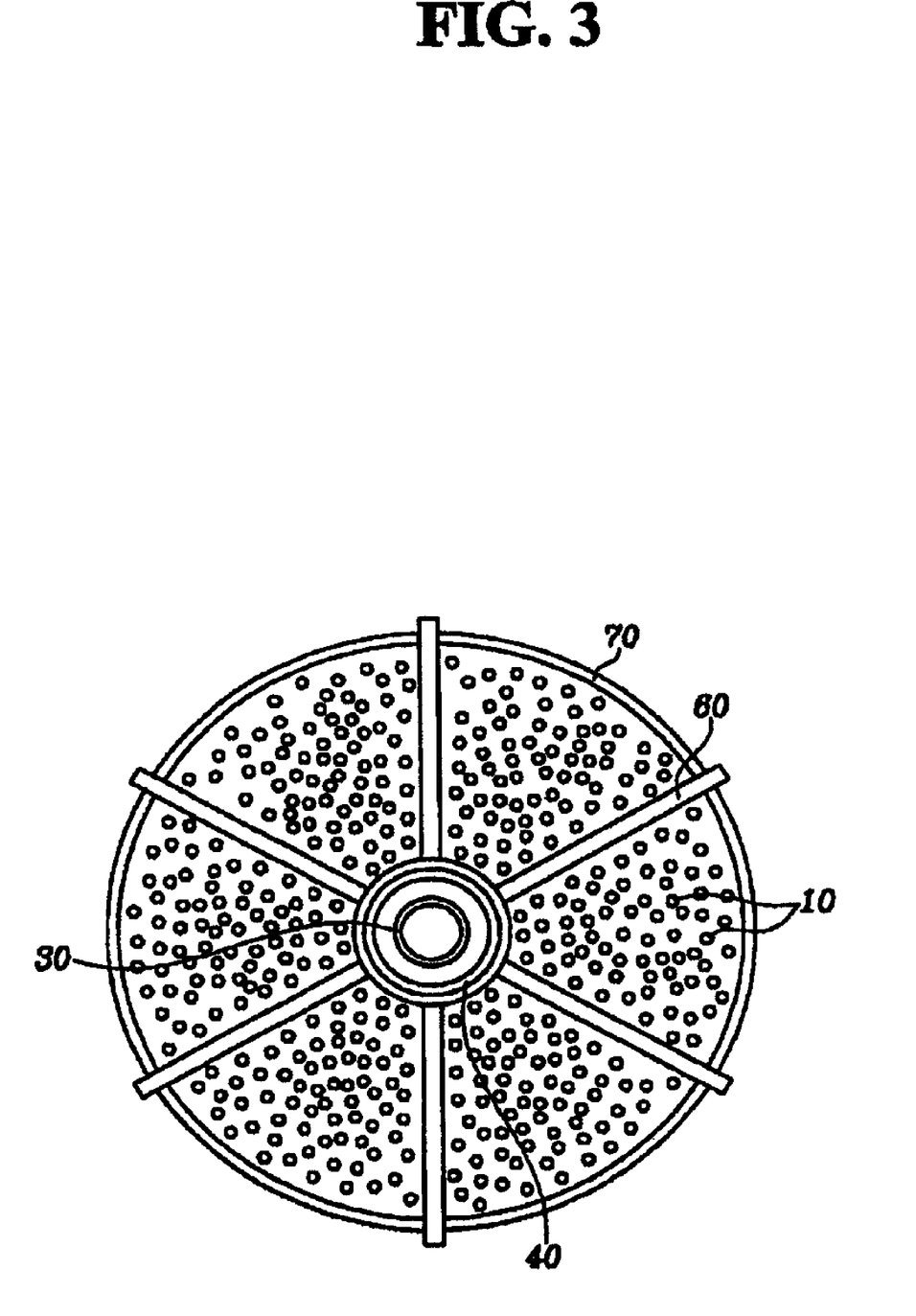
FIG. 3 is a side elevation view of the hollow fiber membrane module according to the embodiment of the present invention.

FIG. 1 is a schematic perspective view of a hollow fiber membrane module according to an embodiment of the present invention, FIG. 2 is a plan sectional view of the hollow fiber membrane module, and FIG. 3 is a side elevation view of the hollow fiber membrane module.

In this embodiment, many hollow fiber membranes makes formation of a unit module.

The embodiments to be described below are illustrated only to exemplify the present invention, and hence, the present invention is not limited to those embodiments.

As shown in the drawings, the hollow fiber membrane module includes bundles of hollow fiber membranes 10 where water treatment is made due to the pressure difference, and a collector 20 with a mold for fixing the bottom ends of the bundles of the hollow fiber membranes 10. A treated-water tube 30 is extended to the inside of the collector 20, and communicated with the inner passage of the hollow fiber membranes 10 to receive the water treated through the hollow fiber membranes 10. A diffuser 50 is installed at the collector 20 to diffuse bubbles to the hollow fiber membranes 10. An air tube 40 is extended to the collector 20, and connected to the diffuser 50 to feed air. Dividers 60 are installed on the collector 20 while proceeding perpendicular thereto to partition the hollow fiber membranes 10 into a plurality of local bundles. A cylindrical-shaped housing 70 externally surrounds the bundles of hollow fiber membranes 10 with a waste water inlet hole 71 at its bottom. The waste water flows in the hollow fiber membranes through the waste water inlet hole 71. A coating film 90 is coated on the outer circumference of the hollow fiber membrane 10.

The treated-water tube 30 is installed at the center of the collector 20, and longitudinally extended along the hollow fiber membrane 10, and an air tube 40 externally surrounds the treated-water tube 30 while forming a double tube structure together with the latter.

The air tube 40 internally installed at the collector 20 is connected to the diffuser 50 of the collector 20, and the inner-sided treated-water tube 30 is communicated with the inner passage of the hollow fiber membranes 10 internal to the collector 20.

The respective structural components of the hollow fiber membrane module will be now explained in detail.

1) Hollow fiber membrane

In this embodiment, the hollow fiber membrane is formed with polysulfone manufactured by the company of SK Chemical.

2) Collector

A mold (not shown) having hollow fiber membranes is mounted with the collector 20 in an airtight manner, and a diffuser 50 is placed at the top of the collector 20 to diffuse bubbles. A predetermined space is provided at the bottom of the collector 20 such that it is communicated with the inner passage of the hollow fiber membranes.

The treated-water tube and the air tube vertically formed at the center of the collector 20 with a double tube structure are extended to the inside of the collector 20 such that the air tube 40 is communicated with the diffuser through the hole formed at the lateral side thereof, and the treated-water tube 30 is communicated with the inner passage of the hollow fiber membranes.

3) Divider

The dividers 60 are arranged around the air tube 40 installed at the center of the collector 20 in a radial direction. The bottom end of each divider 60 is fixed to the collector 20, and the inner lateral end thereof is fixed to the air tube 40.

In this embodiment, as shown in FIG. 1, six dividers 60 are installed while partitioning the hollow fiber membranes 10 into six bundles.

Accordingly, the respective hollow fiber membranes 10 formed at a module may be arranged within several spaces partitioned by the dividers 60. Consequently, the whole hollow fiber membranes 10 of the module are prevented from being one-sidedly biased or entangled under the influence of external force, thereby enlarging the size of the module.

That is, when the diffuser 50 or the module is not balanced, the hollow fiber membranes 10 become directional due to the flow of fluid, and entangled or snarled due to the reverse movement of the fluid flow. In this case, the dividers 60 arranged on the air tube 40 with a predetermined distance delimits the movement of the hollow fiber membranes 10, thereby preventing the hollow fiber membranes 10 from being fallen or entangled.

Of course, the installation structure of the dividers 60 is not limited to the above, but may be varied depending upon the structure or size of the collector 20.

4) Housing

The housing 70 is formed with acryl or PVC, and longitudinally extended along the hollow fiber membranes in the shape of a cylinder or cube.

The housing 70 externally surrounds the hollow fiber membranes 10 of the module. The bottom end of the housing 70 is fixed to the bottom-sided collector 20, and the inner wall thereof is attached to the outer lateral ends of the dividers 60.

A waste water inlet hole 71 is formed at the bottom of the housing 70 along the outer periphery thereof, and the waste water is introduced into the housing 70 via the waste water inlet hole 71 to pass through the hollow fiber membranes 10.

The installation locations of the waste water inlet hole 71 or the height and width thereof are related to the coating locations of the coating film for the hollow fiber membranes, and hence, will be described later.

Like the above, the housing 70 intercepts the hollow fiber membrane module from the outside so that the bubbles from the diffuser 50 do not lose to the outside, but are flown only to the hollow fiber membranes 10 placed within the housing 70 by way of the housing 70. Consequently, even with a small amount of air, the contaminants of the hollow fiber membranes 10 can be effectively removed.

Figure 6:
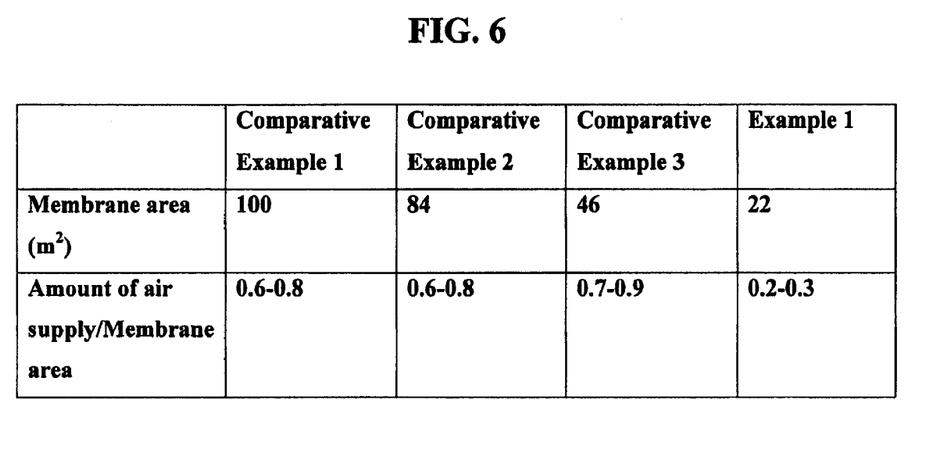
FIG. 6 shows Table 1, which illustrates the results of comparing the amounts of air supply with the conventional hollow fiber membrane module and with the inventive hollow fiber membrane module with a housing.

Table 1, shown in FIG. 6, illustrates the results of comparing the amounts of air supply with the conventional hollow fiber membrane module and with the inventive hollow fiber membrane module with a housing.

The Comparative Example 1 of FIG. 6 is related to a submerged type plane membrane module where the housing is absent, and the diffuser is existent independently of the module.

The Comparative Example 2 of FIG. 6 is related to a submerged type hollow fiber membrane module where collectors are placed at the left and right sides of the module, and the hollow fiber membranes are horizontally installed with no housing.

The Comparative Example 3 of FIG. 6 is related to a submerged type hollow fiber membrane module where collectors are placed at the upper and lower sides of the module, and the hollow fiber membranes are vertically installed with no housing.

The Example 1 of FIG. 6 is related to a hollow fiber membrane module where a housing is installed according to the embodiment of the present invention.

As known from the Table 1 of FIG. 6, the structure with the housing involves reduced amount of air supply per the same membrane area, compared to the structure only with the hollow fiber membranes 10.

5) Fixative

In order to manufacture a hollow fiber membrane module, a plurality of hollow fiber membranes 10 are fixed to a mold (not shown), and the end inner bores of the hollow fiber membranes fixed to the mold are recovered.

The fixatives fix the hollow fiber membranes 10 to the mold. In this embodiment, the fixatives are formed with a permanent fixative 80 for permanently fixing the hollow fiber membranes 10 to the mold, and a temporary fixative 81 for temporarily fixing the ends of the hollow fiber membranes 10 to the mold before the permanent fixing thereof by the permanent fixture 80.

The permanent fixative 80 is formed with a material which does not chemically reacts with the temporary fixture 81, and has a high adhesive strength. The permanent fixative 80 is preferably formed with polyurethane or epoxy, but not limited thereto.

Furthermore, after the temporary fixture 81 is used, it should be removed from the hollow fiber membranes 10. In this embodiment, the structure of recovering the temporary fixture through the solid to liquid phase transition is preferably formed with a material having a melting point of about 45-60° C., more preferably formed with a water soluble material enabling the easy transition from the solid phase to the liquid phase.

Preferably, the temporary fixative 81 is formed with polyethylene glycol (PEG) or silicon, but not limited thereto.

The method of fixing the hollow fiber membrane 10 to the mold using the temporary fixative 81 and the permanent fixative 80 is like the below.

First, the bottommost ends of the hollow fiber membranes 10 are fixed to the mold using the temporary fixative 81. In this process, the temporary fixative 81 is injected into the mold such that it intrudes between the hollow fiber membranes 10, and is fixed thereto.

In this case, as the temporary fixative 81 is in a liquid state, it easily intrudes between the hollow fiber membranes in the mold without using a separate device or a different method.

After the temporary fixative 81 is charged within the mold, the temperature of the mold is lowered to thereby form the temporary fixative in a solid state.

After the temporary fixative 81 is completely hardened, the permanent fixative 80 is injected into the mold over the temporary fixative 81 to permanently fix the hollow fiber membranes 10.

After the permanent fixative 80 is completely hardened, it is reheated to the melting point, thereby altering the solid-phased temporary fixative to be in a liquid state, and recovering it. In this way, the inner bores of the hollow fiber membranes can be recovered, and the temporary fixative can be recycled.

Compared to the structure using only the permanent fixative, the above structure uses watersoluble PEG as the temporary fixative 81, which is recovered through melting, and recycled, thereby preventing the generation of secondary wastes.

Meanwhile, with the structure where the liquid phased temporary fixative 81 is used, in case the distances between the hollow fiber membranes are not uniform, the temporary fixative is liable to ride along the hollow fiber membranes due to the capillary phenomenon. Consequently, the heights of the temporary fixative portions are not uniform, and the temporary fixative 81 is partly elevated up to the location to be charged with the permanent fixative 80, incurring the intrusion failure of the permanent fixative 80.

Figure 4:
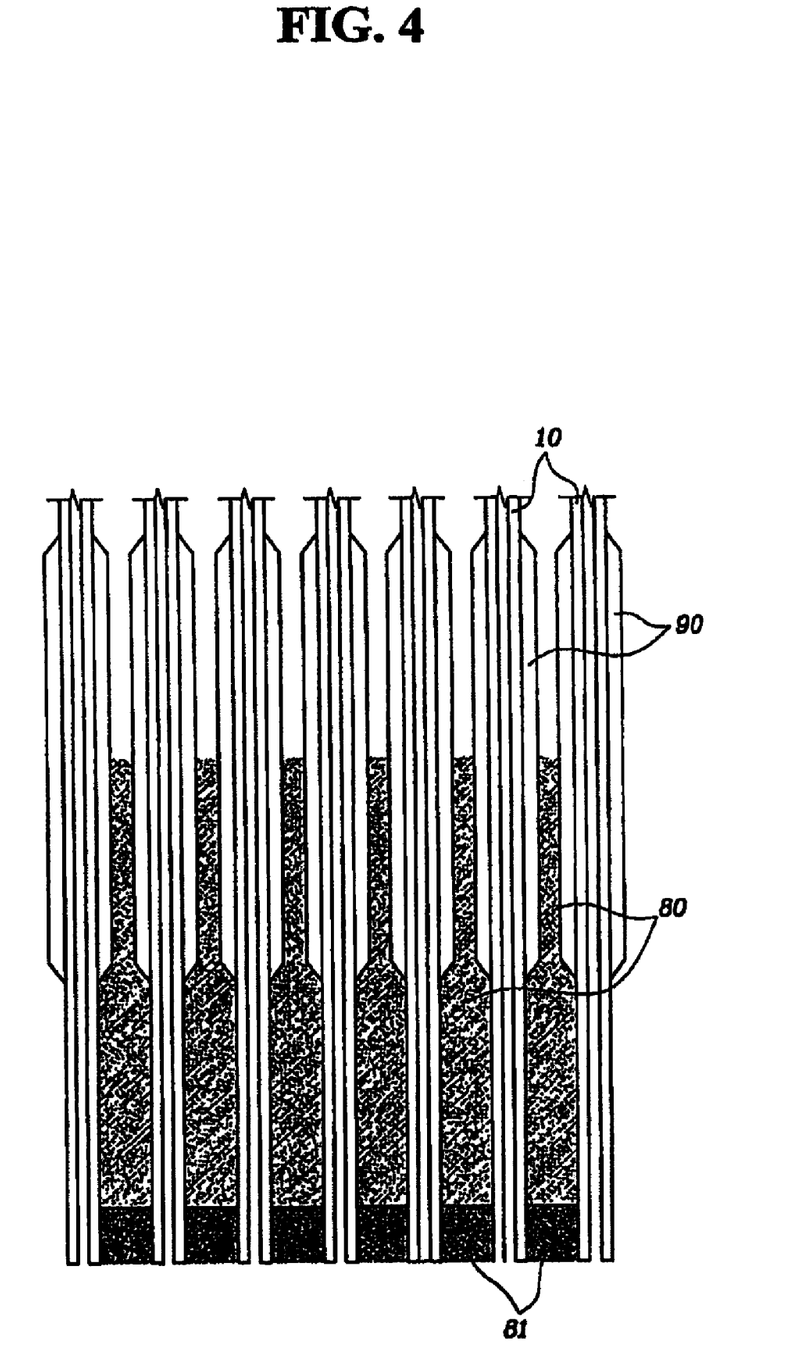
FIG. 4 is a schematic side view of a bottom fixative structure of the hollow fiber membrane module according to the embodiment of the present invention.

In this embodiment, the viscosity of the temporary fixative 81 is controlled by varying the temperature while preventing the capillary phenomenon, thereby forming the temporary fixative 81 between the hollow fiber membranes 10 with a uniform height. FIG. 4 illustrates the structure where the temporary fixative 81 is uniformly injected and formed, and the permanent fixative 80 is injected and formed over the temporary fixative 81.

That is, the process of fixing the hollow fiber membranes 10 comprises the steps of melting the temporary fixative 81 to be in a liquid phase with a high viscosity by elevating the temperature thereof to the melting point, injecting the liquid phased temporary fixative 81 between the hollow fiber membranes 10 and the mold and solidifying the temporary fixative 81 to make unit bodies, putting the respective unit bodies into the mold, and intruding and forming the permanent fixative 80 over the temporary fixative 81, and recovering the temporary fixative 81 by heating the bottom of the mold formed with the temporary fixative 81.

Accordingly, even if the distances between the hollow fiber membrane neighbors are not uniform, the problematic capillary phenomenon is not generated, and the respective unit bodies are primarily formed.

Consequently, the module can be easily made even when it has a large size of 400 m$^2$/module or more.

Furthermore, as the temporary fixative 81 is kept to be in a liquid phase with a high viscosity, the height of the temporary fixative 81 is maintained to be low and uniform, thereby minimizing the pressure loss in the collector 20 at the bottom of the module.

6) Coating film

The coating film 90 is coated on the outer circumference of the hollow fiber membranes, particularly on the bottom portion of the hollow fiber membranes to be intensively loaded to heighten the strength of the hollow fiber membranes 10 as well as to heighten the packing density of the hollow fiber membrane module.

Preferably, the coating film is formed with ethylene vinyl acetate, which is not dissolved in water, and exhibits excellent adhesion to the hollow fiber membranes 10.

Figure 7:
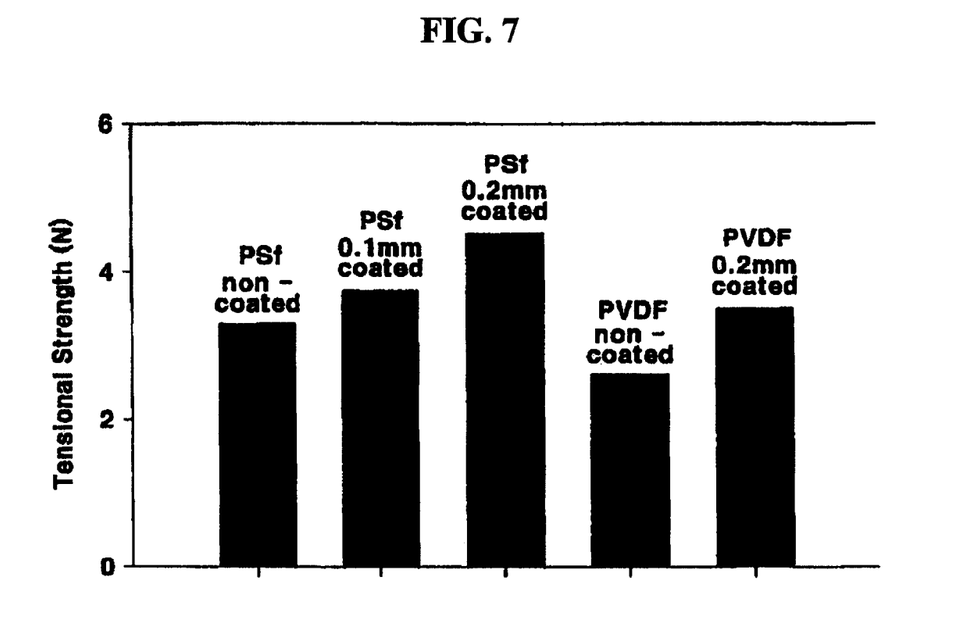
FIG. 7 shows Table 2, which illustrates tensional strength as a function of coating thickness and hollow fiber membrane material.

Table 2 is shown in FIG. 7 and is a graph illustrating the tensional strength as a function of the thickness of the coating film and the material for the hollow fiber membrane. As illustrated in the graph, the coated hollow fiber membrane is higher in its tensional strength than the non-coated one, and among the coated, the hollow fiber membrane with a relatively large coating thickness is higher in its tensional strength.

Figure 8:
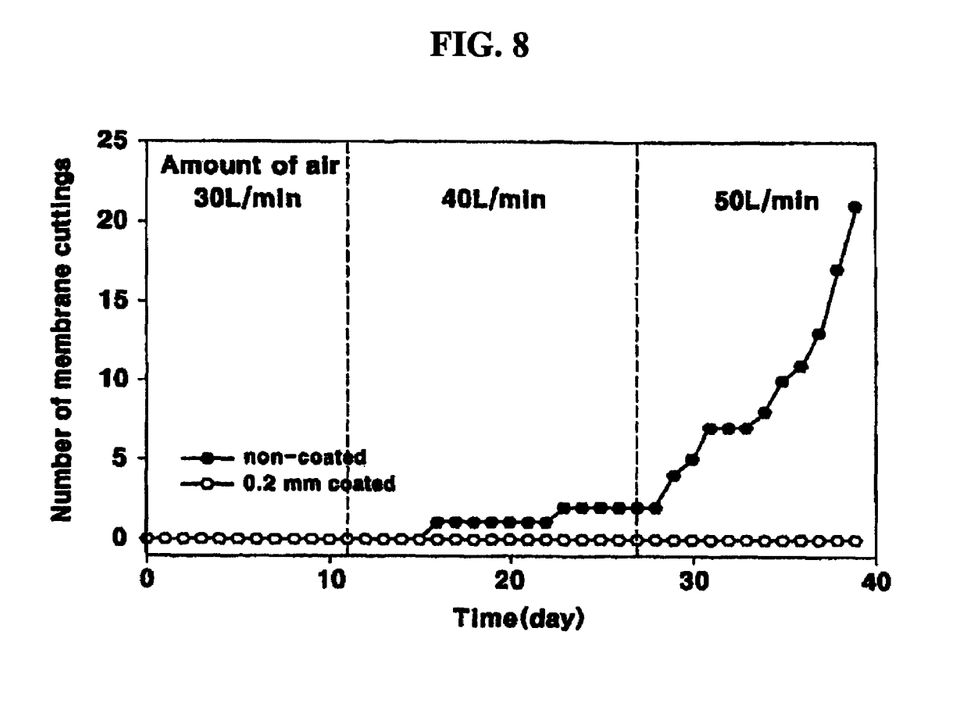
FIG. 8 shows Table 3, which is a graph illustrating variation in the number of cuttings of hollow fiber membranes as a function of coating treatment.

In the graph of FIG. 7, PSf indicates the hollow fiber membrane based on polysulfone, PVDF indicates the hollow fiber membrane based on polyvinylidene fluoride Table 3, shown in FIG. 8, is a graph illustrating the cumulative variation in the number of membrane cuttings in relation to the coated hollow fiber membranes and the non-coated ones. As the time passes by and the amount of air supply is increased, the number of cuttings of the non-coated membranes is increased, whereas the number of cuttings of the coated membranes is maintained constantly.

Like the above, the bottom portion of the hollow fiber membranes is coated with the coating film, thereby preventing the hollow fiber membranes from being cut due to the movement of the hollow fiber membranes.

Meanwhile, the coating film has a role of heightening the packing density of the hollow fiber membrane module. The location of the coating film is closely related to the easiness of the fixative formation, the efficiency in removing the contaminants, and the location of the waste water inlet hole, in the housing.

In this embodiment, the coating film has a bottom end placed at the location of the hollow fiber membrane spaced apart from the bottommost end thereof by a predetermined height, and a top end placed at the location of the hollow fiber membrane spaced apart from the top end of the permanent fixative by a predetermined height.

As the coating film begins not from the bottommost end of the hollow fiber membrane but from the location thereof spaced apart from that end, the following effect can be exerted.

Figure 5:
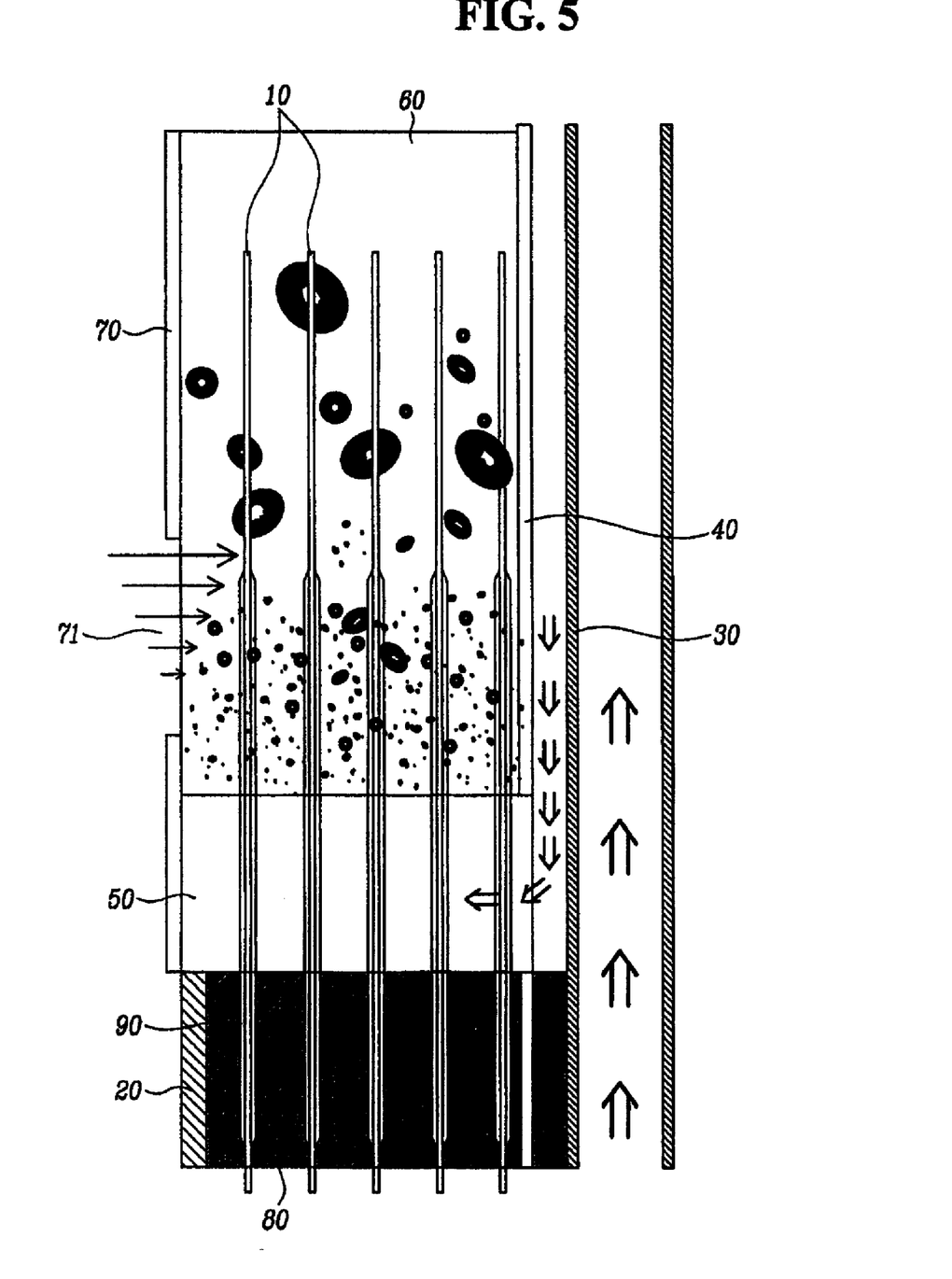
FIG. 5 specifically illustrates the partial structure of the hollow fiber membrane module according to the embodiment of the present invention.

As shown in FIG. 5, when the bottom portions of the hollow fiber membranes 10 coated with the coating film 90 are fixed by the temporary fixative or the respective hollow fiber membranes 10 are fixed by the permanent fixative, as the coated portions thereof are placed over the bottommost ends, the non-coated portions of the hollow fiber membranes are spaced apart from each other with a relatively large distance. Consequently, the permanent fixative 80 fed through a central pipe can fluently intrude between the membranes, and between the coated portions thereof due to the capillary phenomenon. Therefore, compared to the non-coated membranes, the coated membranes involve uniform distance, and the height difference of the fixative can be removed.

The outer diameter of the hollow fiber membrane 10 at the wanted locations is controlled by varying the thickness of the coating film 90, and the gap between the hollow fiber membrane neighbors 10 is constantly maintained to thereby making the intruding of the fixative fluent, and heightening the packing density of the hollow fiber membranes 10.

That is, even though the hollow fiber membranes 10 are densely arranged within a module and the distance between the hollow fiber membranes 10 at the coated portions of the coating film is narrow, after the formation of the temporary fixative 81, a wide space is obtained between the hollow fiber membranes 10 from the top end of the temporary fixative to the bottom end of the coating film by the thickness of the coating 90, thereby making the intruding of the permanent fixative 80 easy. Even when the intruded permanent fixative 80 proceeds upward, and meets the narrowed gap between the hollow fiber membranes 10 coated with the coating film 90, the permanent fixative 80 easily intrudes the narrow gap due to the capillary phenomenon.

Even if many hollow fiber membranes 10 are packed within the module, the permanent fixative 80 is prevented from failing in the intruding thereof. Therefore, even with the submerged type module having the above structure, the packing density of the hollow fiber membranes 10 is heightened to be up to 20-80%, preferably, 40-60%. That is, the capacity per the unit module can be increased two times or more.

Figure 9:
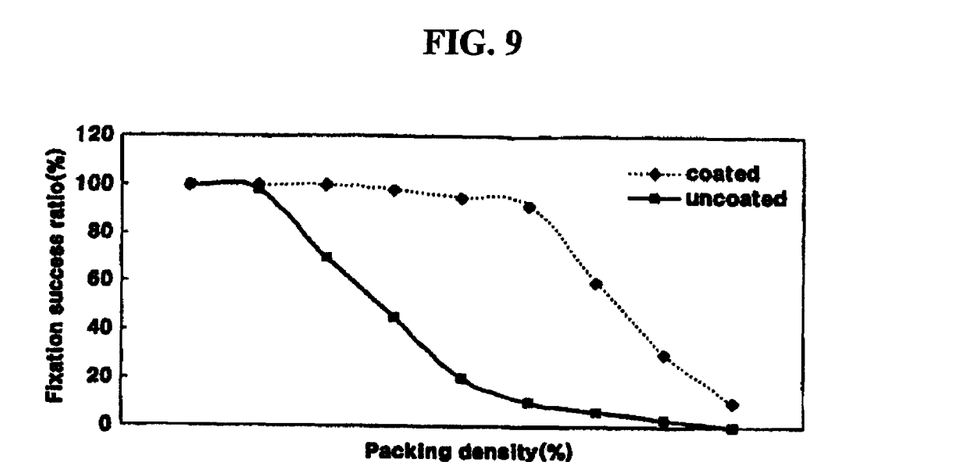
FIG. 9 shows Table 4, which is a graph illustrating the packing density and the fixation success ratio of the hollow fiber membranes with the coating or non-coating thereof.

Table 4, shown in FIG. 9, is a graph illustrating the packing density and the fixation success ratio of the hollow fiber membranes 10 with the coating or non-coating thereof.

As known from the Table 4 of FIG. 9, when the coating film 90 is coated on the hollow fiber membranes 10 of the submerged type module, compared to the non-coated case, the hollow fiber membranes 10 can be completely fixed even when the packing density is elevated to be about 60%.

The packing density of the module of hollow fiber membranes 10 indicates the percentage of the entire unit area of the packed hollow fiber membranes to the unit area of the mold where the hollow fiber membranes 10 are packed (the unit area of the hollow fiber membranes/the unit area of the module), or the number of the packed hollow fiber membranes per the unit area of the module (thread/cm$^2$), or the effective area of the packed hollow fiber membranes per the unit area of the module. It ultimately indicates how many hollow fiber membranes can be packed within the unit area of the module to be formed.

Furthermore, the capillary phenomenon indicates the phenomenon where the liquid rides along the surface of the solid, and the riding height is the value where the surface tension is divided by the multiplication of the density, the acceleration of gravity and a semi-diameter. When the surface tension, the density and the acceleration of gravity are determined at the hollow fiber membrane module in a predetermined manner, the important factor in the riding of the fixative along the gap between the hollow fiber membranes becomes to be the distance between the hollow fiber membranes.

Therefore, in the case of the temporary fixative 81, when the bottommost ends of the hollow fiber membranes 10 are initially fixed by the temporary fixative 81, as the gap between the bottommost ends of the hollow fiber membranes is widened by the coating film 90, the riding height of the temporary fixative 81 is limited due to the capillary phenomenon. Furthermore, when the viscosity of the temporary fixative 81 is increased by controlling the temperature, the affection due to the capillary phenomenon can be minimized.

Furthermore, with the above structure, the height of intruding of the temporary fixative can be minimized to be about 5-10 mm, preferably, about 2-5 mm, thereby reducing the amount of usage of the temporary fixative.

By contrast, in the case of the permanent fixative 80, as the space from the top end of the temporary fixative 81 to the bottom end of the coating film 90 is extended by the coating film 90, the intruding of the permanent fixative 80 can be made easily. In the area between the coating film 90 and the mold with the narrowed gap, the permanent fixative easily rides along the hollow fiber membranes 10 due to the capillary phenomenon, and fixes the hollow fiber membranes 10.

The operation effect by way of the coating film 90 makes it possible to solve the problem induced by the way of using a liquid-phased temporary fixative differed in the specific gravity from the conventional permanent fixative, that is, to prevent the occurrence of the phenomenon where the bottom liquid-phased temporary filler rides along the hollow fiber membranes 10 due to the capillarity, and fills the location of intrusion of the permanent fixative.

Meanwhile, the reason that the coating film 90 is spaced apart from the top end of the permanent fixative 80 will be now explained. In this embodiment, the hollow fiber membrane receives greatest pressure at its interface with the permanent fixative 80 through filtering the waste water based on the pressure reduction, and the contamination is initially made at that location. The location is not directly influenced by the scrubbing effect due to the bubbles from the diffuser, and the contaminants are continuously accumulated upward while making it impossible to take the role of the hollow fiber membranes.

This is because the initial filtering by the pressure reduction is made at the location not influenced by the bubbles. As the coating film 90 is coated to the location upwardly spaced apart from the permanent fixative 80 by a predetermined height, the pressure reduction does not occur at the bottommost end portions of the hollow fiber membranes interfacing with the permanent fixative 80, but begins from the location of the hollow fiber membranes wholly influenced by the bubbles.

Furthermore, the following two conditions are presupposed in relation to the waste water inlet hole 71 of the housing 70.

First, the pressure reduction is initiated at the location of the hollow fiber membranes corresponding to the bottom end of the coating film 90 (at the initiating position of the non-coated hollow fiber membranes), and the contaminants are accumulated there. At that location, the contamination due to the sludge cake is increased upwards.

Second, the waste water inlet hole formed at the bottom of the housing involves the quickest flow speed at the topmost portion thereof.

With the two presuppositions, the top end of the coating film 90 and the top end of the waste water inlet hole of the housing are aligned to the same height, or the top end of the waste water inlet hole is positioned to a relatively higher location so that the efficiency of removing the contaminants accumulated at the surface of the hollow fiber membranes can be heightened.

The operation of the hollow fiber membranes will be now explained.

The waste water is introduced into the housing 70 through the inlet hole 71 thereof, and filtered by the hollow fiber membranes 10. The filtered water is discharged through the treated-water tube 30 communicated with the inner passage of the hollow fiber membranes 10.

The air fed through the air tube 40 is diffused through the diffuser 50 in the shape of bubbles, and the bubbles ride along the inner wall of the housing 70 while vibrating the hollow fiber membranes 10, thereby sweeping away the contaminants attached to the hollow fiber membranes.

With the process of sweeping away the contaminants by the bubbles, the air fed through the air tube by opening the air valve is introduced into the diffuser of the collector, and diffused to the housing through a plurality of spray holes formed at the diffuser in the shape of bubbles.

As the diffuser is placed over the entire surface of the collector, even if the module is divided into several regions by the dividers, the bubbles are uniformly diffused over all the regions.

The bubbles ride along the hollow fiber membranes while remaining within the housing to vibrate the hollow fiber membranes with top free ends. In this process, the contaminant particles attached to the plurality of hollow fiber membranes are detached, thereby preventing the scale formation.

As described above, with the inventive hollow fiber membrane module, the efficiency of removing scale-like contaminants can be heightened.

Furthermore, the packing density of the hollow fiber membrane module is maximized to thereby obtain the effect of heightening the water treatment capacity per the unit module.

In addition, the hollow fiber membranes are prevented from being entangled or fallen, thereby enlarging the module size.

The bubbles diffused through the diffuser are concentrated on the hollow fiber membranes, thereby heightening the utilization of the bubbles and maximizing the contaminant removal efficiency per the amount of air supply.

The occurrence of secondary wastes due to the hollow fiber membranes is reduced, and the clogging of the inner bore of the hollow fiber membranes or the inflow of the contaminants to the treated water is prevented.

Furthermore, the rigidity of the hollow fiber membranes is heightened to prevent the hollow fiber membranes from being cut, and to elongate the lifespan thereof.

Although preferred embodiments of the present invention have been described in detail hereinabove, it should be clearly understood that many variations and/or modifications of the basic inventive concept herein taught which may appear to those skilled in the art will still fall within the spirit and scope of the present invention, as defined in the appended claims.

What is claimed is:

1. A hollow fiber membrane module comprising:
   a plurality of bundles of hollow fiber membranes for water treatment resulting from a pressure difference, each hollow fiber membrane having a top ends end, and wherein a coating film based on a water-insoluble material is coated on the outer circumference of the hollow fiber membranes;
   a collector fixing bottom ends of the bundles of hollow fiber membranes;
   a housing placed over the collector with a predetermined gap therebetween and surrounding the bundles of hollow fiber membranes, the housing having a waste water inlet hole at a bottom end facing the collector, wherein a top end of the waste water inlet hole is placed at a plane higher than the top end of the coating film;
   dividers provided inside the housing and positioned between the bundles of hollow fiber membranes to partition the bundles of hollow fiber membranes;
   a treated-water tube installed at a center of the bundles of hollow fiber membranes and extended inside the collector, the treated-water tube having a bottom treated-water inlet hole communicating with inner passages of the hollow fiber membranes and a top treated-water outlet hole to exhaust treated-water;
   an air tube externally surrounding the treated-water tube with a predetermined gap therebetween and having a top air inlet hole to receive air and a bottom air outlet hole to exhaust air, with the bottom air outlet hole placed over the collector; and
   a diffuser placed between the collector and the waste water inlet hole and surrounding the bottom air outlet hole and the bundles of hollow fiber membranes, the diffuser receiving air from the bottom air outlet hole and diffusing air bubbles to all the bundles of hollow fiber membranes partitioned by the dividers.

2. The hollow fiber membrane module of claim 1, further comprising fixatives for fixing the hollow fiber membranes to a mold of the collector, the fixatives being a permanent fixative injected between the hollow fiber membranes to fix the hollow fiber membranes to each other, the permanent fixative having a bottom end spaced apart from the end of the hollow fiber membranes by a predetermined distance.

3. The hollow fiber membrane module of claim 2, wherein the coating film has a thickness smaller than a gap between the hollow fiber membranes.

4. The hollow fiber membrane module of claim 3, wherein the coating film is formed with a material having a high viscosity.

5. The hollow fiber membrane module of claim 4, wherein the coating film has a bottom end placed at a location of the hollow fiber membrane that is spaced apart from the bottom-most end of the hollow fiber membrane by a predetermined distance.

6. The hollow fiber membrane module of claim 4, wherein the coating film has a top end placed at a location of the hollow fiber membrane that is spaced apart from the top end of the permanent fixative by a predetermined distance.

7. A method of manufacturing the hollow fiber membrane module of claim 1 with a process of fixing hollow fiber membranes to a mold, the process comprising the steps of:

melting a temporary fixative to be in a liquid phase;

injecting the liquid-phased temporary fixative between the hollow fiber membranes and the mold, and solidifying the temporary fixative to make unit bodies;

putting the respective unit bodies within a whole mold, and introducing a permanent fixative to the membranes over the temporary fixative; and recovering the temporary fixative by heating the bottom end portion of the mold formed with the temporary fixative.

8. The method of claim 7, wherein the temporary fixative has a temperature-controlled viscosity such that no capillary phenomenon occurs between the hollow fiber membranes.

9. The method of claim 8, wherein the temporary fixative between the hollow fiber membranes has a height of 10 mm or less.

10. The hollow fiber membrane module of claim 5, wherein the permanent fixative is formed with a material selected from the group consisting of polyurethane, epoxy and rubber.

11. The hollow fiber membrane module of claim 4, wherein the coating film is formed with ethylene vinyl acetate.

* * * * *

UNITED STATES PATENT AND TRADEMARK OFFICE
CERTIFICATE OF CORRECTION

PATENT NO. : 7,704,393 B2  
APPLICATION NO. : 10/556314  
DATED : April 27, 2010  
INVENTOR(S) : Noh et al.

It is certified that error appears in the above-identified patent and that said Letters Patent is hereby corrected as shown below:

Column 7,  
Line 44, "treated-water tube 30 is communicated" should read --treated-water tube 30 is extended to the bottom side, and communicated--;  
Line 66, "communicated with the inner passage" should read --communicated with the hole formed at the lateral side thereof as well as with the inner passage--.

Column 16,  
Line 5, "claim 5" should read --claim 2--.

Signed and Sealed this  
Eighteenth Day of January, 2011

David J. Kappos  
*Director of the United States Patent and Trademark Office*